United States Patent [19]
Ramsey, Jr. et al.

[11] 3,864,510
[45] Feb. 4, 1975

[54] PEDESTAL CLOSURE FOR BURIED CABLE

[75] Inventors: Edward Lewis Ramsey, Jr., Martinsville; Arnold Ray Smith, Chester, both of N.J.

[73] Assignee: Bell Telephone Laboratories, Incorporated, Murray Hill, N.J.

[22] Filed: Feb. 15, 1974

[21] Appl. No.: 442,851

[52] U.S. Cl. .................................. 174/38, 174/51
[51] Int. Cl. .............................................. H02g 9/02
[58] Field of Search ........... 174/37, 38, 51, 60, 101; 317/120

[56] References Cited
UNITED STATES PATENTS

| | | | |
|---|---|---|---|
| 3,164,668 | 1/1965 | Skubal | 174/38 UX |
| 3,268,651 | 8/1966 | Stevenson | 174/38 |
| 3,404,212 | 10/1968 | Mack et al. | 174/38 |
| 3,740,452 | 6/1973 | Bunten | 174/38 |
| R27,746 | 8/1973 | Hamilton | 174/38 |
| R27,898 | 1/1974 | Baumgartner | 174/38 |

*Primary Examiner*—Laramie E. Askin
*Attorney, Agent, or Firm*—A. D. Hooper

[57] ABSTRACT

A pedestal closure includes a channel-shaped rear member and upper and lower channel-shaped front members mating therewith to define a terminal chamber. A backboard is hinged to a bracket mounted on the rear member to divide the upper portion of the chamber into front and rear compartments for assigned and unassigned conductors, respectively. The backboard is electrically connected to a grounding bracket via a flexible conductor which allows movement of the backboard without disturbing the ground connection. The lower front member includes a vertical channel formed in the exterior face thereof for receiving conductors such as service wires so that these conductors can be readily added to or removed from an installed closure without the removal of the lower front member. The vertical channel has a lid including a slotted opening along the edge thereof which permits installation of a conductor when the surrounding soil is frozen and subsequent burial of such conductor without disrupting the service.

14 Claims, 2 Drawing Figures

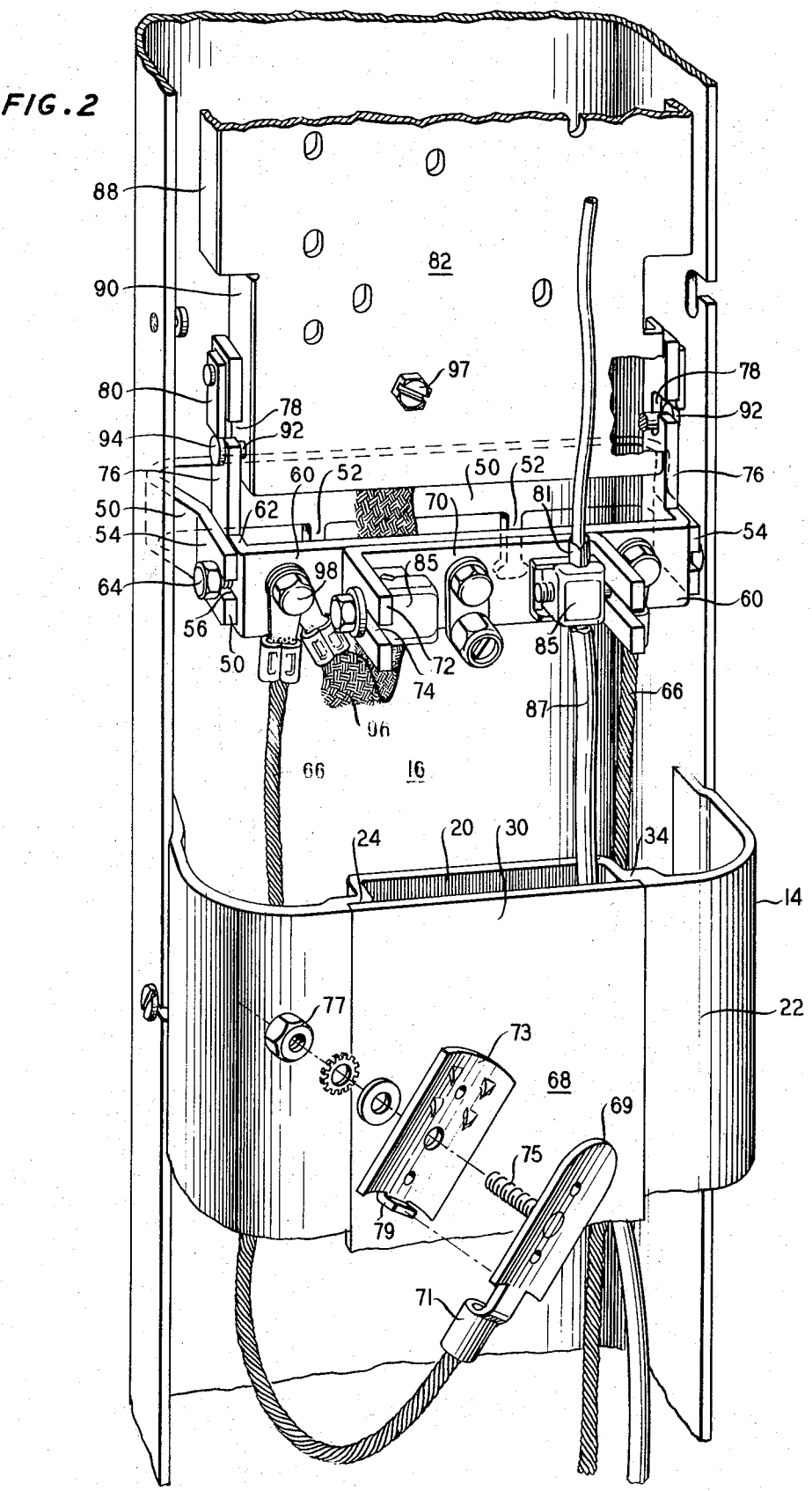

PEDESTAL CLOSURE FOR BURIED CABLE

BACKGROUND OF THE INVENTION

1. Field of the Invention

This invention relates to above-ground splicing or connection terminals or closures for buried utility cables and particularly buried telephone cables.

2. Description of the Prior Art

Pedestal cable closures are installed at locations along buried cable routes where it is desired to make connection by either aerial or buried conductors to the conductors within such buried cable, e.g., to connect service wires thereto or to splice smaller distribution cables thereto. A commonly used closure includes a U-shaped or channel-shaped rear member and upper and lower channel shaped front members which mate with the rear member to define a terminal chamber of substantially uniform cross section throughout the length of the closure. The bottom portions of the rear member and the lower front member are installed in the ground, frequently in a layer or bed of gravel, over the buried cable which is then looped or has the two separate ends thereof inserted up into the terminal chamber where the desired connections can be made. Buried service wires or cables to be connected also enter the closure through the bottom of the terminal chamber and extend upward therethrough to the upper part of the chamber where the connections are made. Installation of such service wires or small cables presents no problem during initial installation of the closure. However, the installation or removal of service wires or cables after initial installation of the closure becomes a difficult task. For example, the addition of a buried service wire requires removal of the surrounding soil to the bottom of the closure and the working of the service wire up through the soil or gravel backfill within the bottom portion of the terminal chamber into the splicing portion of the chamber. Such activity often allows the gravel backfill to shift out of the closure and it is very difficult to work the service wire up through such backfill. The provision of service wire channels or guards within some existing closures has helped in the installation or removal of service wires and cables after the initial installation of the closure, but has by no means eliminated the problems discussed above.

Accordingly, it is an object of this invention to improve pedestal closures to permit the easy installation or removal of conductors such as service wires or small cables therein after initial installation of the closure.

Service wires and like buried conductors frequently must be installed in pedestal closures when the surrounding soil is frozen too hard to permit burial of such wires or the removal of soil from around the closure to allow the wires to be fed up through the terminal chamber. Such wires are commonly inserted through above-ground holes in the sides of the presently used closure into the terminal chamber. Subsequent burial of such wires requires the disconnection and reconnection thereof so that the wires can be fed up through the chamber.

Accordingly, it is another object of this invention to provide for the installation and connection of conductors such as service wires in pedestal closures and the subsequent burial of such conductors without disruption of the previously made connections thereto.

Many existing closures utilize backboards or partitions therein for dividing the upper part of the terminal chamber, i.e., the splicing part of the chamber, into front and rear compartments, respectively, for containing the assigned and unassigned conductors. These backboards are usually mounted to permit complete removal thereof and also permit rotating movement to and from a position allowing access to the rear compartment. Existing means for mounting the backboards have various disadvantages including low weight or load carrying ability and difficulty in removal and replacement of the backboard.

Accordingly, it is another object of this invention to improve the means for mounting backboards or partition members within pedestal closures.

Still another problem with existing closures is the relatively large number of loose parts such as cable shield grounding connectors which must be installed during the installation of such closures. Further, the existing connectors do not provide for relaxation of the cable shield without degrading the ground connection.

Accordingly, still another object of this invention is to minimize the field assembly of loose parts upon installation of pedestal closures.

SUMMARY OF THE INVENTION

The foregoing objects and others are achieved in accordance with this invention by a pedestal closure comprising a channel shaped rear member and upper and lower channel shaped front members which mate therewith to define a terminal chamber. The lower front member has a vertical channel formed in the exterior face thereof which is designed to receive conductors such as service wires therein and provide access at the top thereof into the upper part of the terminal chamber. The conductor or service wire channel includes a cover thereover having a grommeted slot which permits the initial above-ground installation of a service wire and the subsequent burial of such wire without disturbing the previously made connection. The closure includes a backboard which is detachably and rotatably mounted to a grounding bracket by a pin and locking tab arrangement which holds the backboard securely in place, but allows easy removal thereof. A flexible grounding strap connects the backboard to the grounding bracket. Cable shield connectors ground any enclosed cable shield to the grounding bracket through a long flexible strap which accommodates cable sheath pullback without loss of the ground connection.

BRIEF DESCRIPTION OF THE DRAWING

The invention will be more fully comprehended from the following detailed description and accompanying drawing in which:

FIG. 2 is an enlarged partly broken away view of a portion of the closure of FIG. 1 showing a service wire therein.

DETAILED DESCRIPTION

Figure 1:
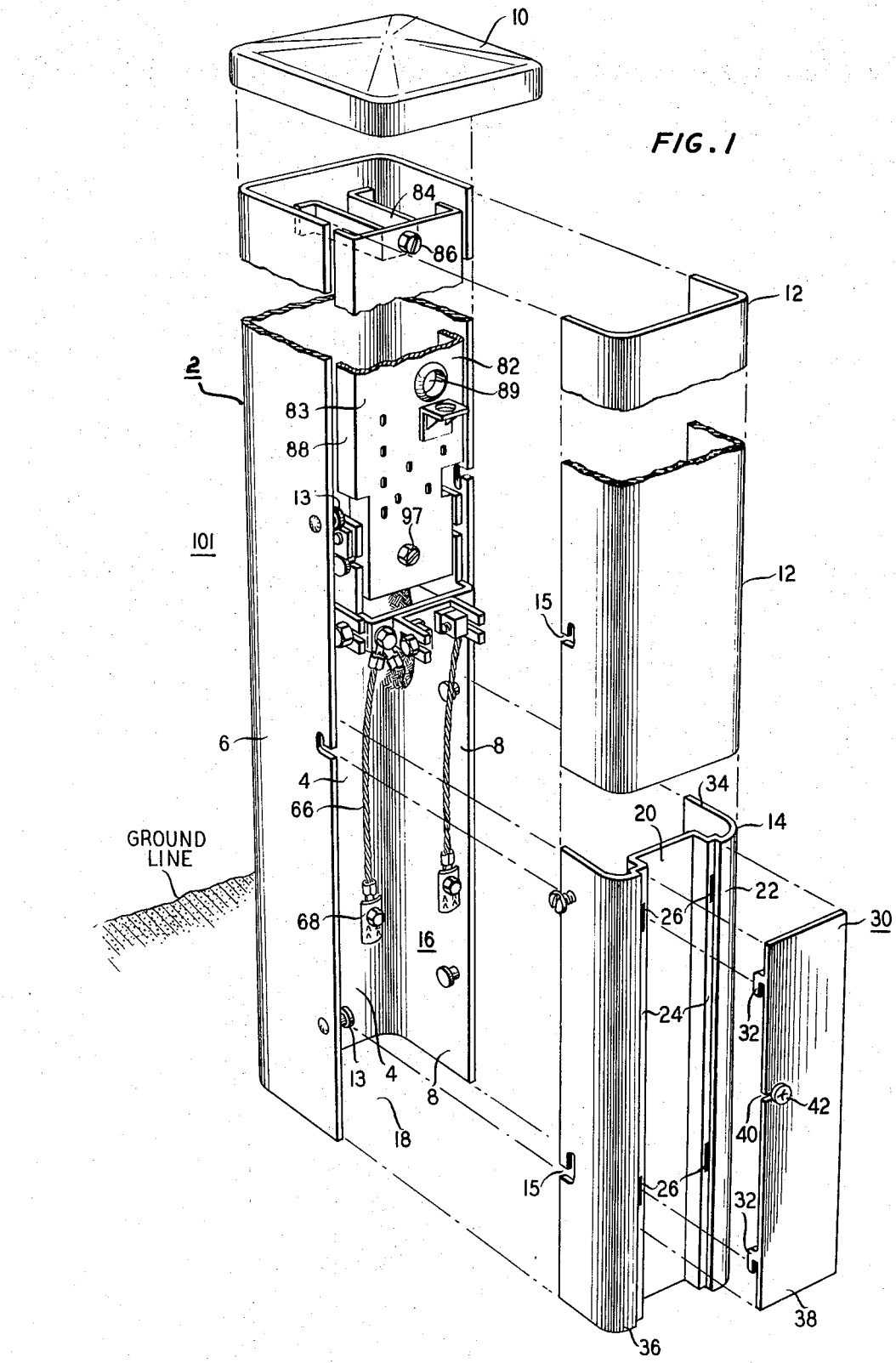
FIG. 1 is an exploded perspective view of a closure in accordance with this invention.

Referring now to FIG. 1, there is shown a pedestal closure 101 comprising a channel or U-shaped rear member 2 extending the full length of closure 101 and having a rear wall 4 with two side walls or flanges 6 and 8 extending forwardly therefrom. A cap 10 is fastened along the top of member 2. Upper and lower generally channel shaped front members 12 and 14, respectively, have rearwardly extending flanges which are adapted to mate with the flanges 6 and 8 of rear member 2 to define an elongated generally rectangular cross sectioned terminal chamber 16 having an open bottom or end 18. Members 12 and 14 are detachably mounted on or mated with member 2 by mating pin-and-slot combinations such as pins 13 and slots 15 in the overlapping or mating flanges as is well known in the art. In normal usage closure 101 would be installed in the ground over a buried cable to a depth approximately midway up the height of lower front member 14 and a loop of cable or the ends of two or more cable sections would be pulled through end 18 up into substantially the full height of terminal chamber 16. Closure 101 is then backfilled with gravel to grade level or slightly above and the soil replaced around the exterior thereof.

Conductors such as service wires or small cables to connect to the buried cable would, in accordance with present practice, also be pulled through end 18 into the top of chamber 16. However, in accordance with one feature of this invention, lower front member 14 has a vertical channel or trough 20 formed in the exterior face 22 thereof for receiving service wires, small distribution cable, and like conductors therein. Channel 20 advantageously extends the full height of member 14. Channel 20 terminates in two shelves or ledges 24 which are depressed below the surface of face 22 along the sides of channel 20. Shelves 24 include slots 26 at spaced points therealong.

A lid or cover 30 is adapted to fit over channel 20 with tabs 32 extending therefrom engaging slots 26 so that lid 30 is securely but detachably mounted on shelves 24 over channel 20. Cover 30 is substantially flush with the top end 34 of lower front cover 14 but advantageously is terminated above the bottom end 36 of cover 14 to leave a portion of channel 20 uncovered, i.e., cover 30 advantageously is shorter than the height of channel 20. When lid 30 is mounted over channel 20, it forms a substantially coplanar surface with the portions of face 22 adjacent ledges 24. When both upper and lower front covers 12 and 14, respectively, are mounted on member 2, the coplanar surface formed by lid 30 and exterior face 22 of cover 14 advantageously lies beneath the inside surface of cover 12 so that lid 30 is also held in place by cover 12. Accordingly, it should be apparent that when both front covers 12 and 14 are mounted, the top end of channel 20 opens into or has access to the upper part of chamber 16 behind upper front cover 12, i.e., the normal splicing portion of chamber 16.

Service wires or distribution cables can be readily placed in channel 20 and thereby have access to chamber 16 by simply removing lid 30 after the removal of top cover 12 without any necessity for disturbing the remainder of lower front cover 14. Likewise, service wires can readily be removed from the terminal and channel 20. The lower end 38 of lid 30 normally will extend below ground level when closure 101 is installed. However, since end 38 lies above end 36 of cover 14, the soil need only be removed to the depth of end 38 in order to remove lid 30. Thus there is no problem with any gravel backfill within the lower part of chamber 16 spilling therefrom. Even though service wires and cables can be readily added to closure 101 via channel 20, it should be apparent that such wires are as fully protected once lid 30 is installed as are the service wires in existing closures inside the lower portion of the closure chamber.

Lid 30 includes a slot 40 along at least one edge thereof which terminates in a grommeted hole 42 having access to channel 20 when lid 30 is installed thereover. Slot 40 and hole 42 will lie slightly above ground level when closure 101 is installed. A service wire can be inserted through hole 42 into channel 20 and thereby have access to chamber 16 even if the surrounding soil is too frozen to permit digging and removal of lid 30 and complete burial of the service wire. When the soil subsequently thaws, cover 30 can be removed and the service wire can be moved through slot 40 into its normal position in channel 20 without any disturbance to the previously made connection in chamber 16. No existing closure is believed to provide such a feature.

As shown in detail in FIG. 2, a mounting bracket 50 is mounted to the interior surface of rear wall 4 and flanges 6 and 8 of rear member 2 above the top end or edge 34 of lower front member 14. If desired, bracket 50 can include tabs or flanges 52 extending downwardly therefrom to which the cables loops or ends extending up into closure 101 can be fastened by hose clamps, cable ties or similar mounting apparatus. Bracket 50 has two arms 54 extending forwardly inside flanges 6 and 8. Arms 54 include slots 56 in the ends thereof.

A U-shaped ground bracket 60 has the legs 62 thereof extending rearwardly along the inner surface of arms 54 and fastened thereto by bolts or other mounting hardware 64 in slots 56. The mounting position of grounding bracket 60 can be adjusted by adjusting the position of bolts 64 in slots 56 and bracket 60 can also be readily removed to allow the installation or removal of closure 101 over cables. Mounted to the front of bracket 60 are conductive straps 66 having cable bond clamps or shield connectors 68 mounted on the ends thereof. Shield connector 68 includes an inner plate or shoe 69 having a crimp lug 71 on one end thereof to which conductor 66 is permanently crimped or fastened. Inner plate 69 is adapted for installation or insertion into a cable in contact with the electrical shield therein. An outer plate 73 is mounted on a threaded stud 75 extending outward from inner plate 69 and is mounted over the exterior of the cable sheath. Plates 69 and 73 are forced toward each other by tightening nut 77 which is staked on stud 75. A tab 79 depends from outer plate 73 and contacts plate 69 when the plates are forced together to provide a pivot about one end of the plate so that the cable sheath and shield are tightly clamped between the other ends of plates 69 and 73. The direct ground path for the cable shield through crimp lug 71 and strap 66 is much better than the ground path provided by existing shield connectors in which the ground strap is nonpermanently installed on stud 75 by a nut. The length and flexibility of strap 66 allows relatively large movements of the cable shields such as might occur from cable sheath relaxation and pullback without any danger of loss of electrical continuity therewith. The factory mounting of straps 66 to bracket 60 and the factory mounting of connectors 68 to straps 66 decreases the number of loose parts that require field assembly and thereby decreases the time required for installing closure 101.

Another U-shaped bracket 70 is integrally mounted to the front of bracket 60 and includes outwardly extending arms 72 having slots 74 therein. Slots 74 are adapted to receive mounting hardware or connections 85 such as the well known Fargo connectors which ground the shield 81 of service wires or small cables 87 received therein. Connectors 85 mounted on bracket 70 are located just above the end of channel 20 for ready access to service wires 87 entering chamber 16 through channel 20.

Bracket 60 includes two flanges 76 upstanding from legs 62 along the inner surface of legs 54. Flange 76 includes an L-shaped slot 78 therein with one leg thereof oriented horizontally and opening toward the front edge of flange 76 and the other leg oriented vertically and extending downward from the horizontal leg. A latch or clip 80 is rotatably mounted near the top of the flange 76 and is adapted to rotate downward under its own weight to a position approximately covering the junction of the horizontal and vertical legs of slot 78 for a reason to become more apparent subsequently.

A backboard or panel 82 is mounted in the upper part of chamber 16 to divide this portion of chamber 16 into front and rear compartments to improve the "housekeeping" therein as is known in the art. A generally U-shaped bracket 84 (see FIG. 1) is mounted to rear wall 4 of rear member 2 near the top thereof. Backboard 82 is connected near its top to bracket 84 by a bolt 86 or similar mounting hardware through the center wall 83 thereof. Bolt 86 can be disconnected to allow movement and removal of panel 82. Panel 82 also includes rearwardly extending flanges or side walls 88 along a substantial portion of the vertical edges of center wall 83. Near the bottom of backboard 82 are short side wall sections or flanges 90 which are recessed into center wall 83 with respect to flanges 88 and may have a width different than flanges 88. Shouldered pins or rivets 92 are attached to and extend outward from flanges 90. Pins 92 are adapted to be received within slots 78 on flanges 76 with the heads 94 thereof lying on the outside of flanges 76. As pin 92 is initially inserted into slot 78 and moved along the horizontal leg thereof, it contacts latch 80 and rotates or pushes this latch aside. When pin 92 reaches the junction of the horizontal and vertical legs of slot 78, it drops down to the bottom of the vertical leg. Thereupon, latch 80 swings back to its normal position at which it restrains pin 92 in the vertical leg by contacting head 94 to prevent upward movement thereof. In this restrained position, backboard 82 can still rotate freely about pins 92 which serve as a hinge when bolt 86 is released to free the top of backboard 82. Latch 80 can be easily rotated aside when it is desired to remove or install backboard 82. Brackets 76 and pins 92 provide a high load carrying capability for backboard 82.

Backboard 82 is grounded to bracket 60 by a flexible conductive strap 96 which is bolted on respective ends to backboard 82 and bracket 60 by bolts 97 and 98. Strap 96 accommodates any rotation or movement of backboard 82 without danger of degrading the ground connection.

The front surface of center wall 83 of backboard 82 advantageously extends no further forward than the front face of bracket 60. Thus, service wire exiting the top of channel 20 can follow a substantially straight path from channel 20 through connectors 85 mounted on arms 72 to the front face of wall 83 where they can be connected to assigned conductors routed through a grommeted opening 89 in wall 83 from the cable loops behind backboard 82 or connected to terminal blocks or other apparatus which is mounted on wall 83.

It should be apparent from the foregoing description that a pedestal cable closure in accordance with this invention has significant advantages over prior art closures in such features as installation and removal of service wires after initial installation of the closure; removal, movement, and load carrying capability of the backboard; and grounding of the cable shields, etc. While the invention has been described with respect to a specific embodiment thereof, it is to be understood that various modifications might be made thereto without departing from the spirit and scope of the following claims.

What is claimed is:

1. An enclosure for above-ground terminals of a buried cable installation comprising a rear member having a vertically elongated rear wall and forwardly projecting side walls, a cap at the top of said rear member, and upper and lower front cover members detachably secured to said rear member to define a terminal chamber for housing said terminals, characterized in that:
   said lower front cover member includes a vertically oriented channel formed in the exterior face thereof adapted for receiving conductors therein and providing access for said conductors into said chamber.

2. Apparatus in accordance with claim 1 including a lid detachably connected on said exterior face for covering at least a portion of said channel.

3. Apparatus in accordance with claim 2 wherein said lower front cover member has top and bottom ends specifying the height thereof, said channel extends said height of said lower front cover member;
   said lid has a length less than said height, said lid being detachably secured to said exterior face with one end thereof substantially flush with said top end of said lower front cover member so that a portion of said channel adjacent said bottom end of said lower front cover member remains uncovered.

4. Apparatus in accordance with claim 2 wherein said lid includes a slot along one edge thereof adapted for receiving a conductor therein for providing access for said conductor to a portion of said channel and thereby to said chamber whereby upon removal of said lid said conductor can be removed from said slot and placed along said entire channel without disconnecting said conductor within said chamber.

5. Apparatus in accordance with claim 2 wherein said upper front cover member includes a front wall having a portion overlying a portion of said exterior face of said lower front cover member when said lid is secured on said lower front cover member, and said upper and lower front cover members are secured to said rear member so that said channel provides access to said portion of said chamber behind said upper front cover member for said conductors received therein and said lid is held in place by said upper front cover member.

6. Apparatus in accordance with claim 1 including a partition member dividing a portion of said chamber above said lower front cover member and behind said upper front cover member into front and rear compartments, respectively, adjacent said upper front cover member and said rear member, said channel providing access for said conductors to said front compartment.

7. Apparatus in accordance with claim 6 wherein said partition member comprises a center wall substantially parallel to said rear wall and spaced therefrom, said center wall having edges with flanges extending therefrom substantially perpendicular thereto, and pins extending outward from said flanges on one end of said partition member;

said enclosure including bracket means mounted in said chamber above said lower front cover member, said bracket means includes upstanding flanges thereon having slots therein receiving said pins to rotatably mount said partition member on said one end.

8. Apparatus in accordance with claim 7 including a second bracket means mounted to said rear wall adjacent the top thereof and having a first opening therein for receiving a fastening means, said center wall of said partition member including a second opening therethrough on a second end thereof aligned with said first opening when said partition member is mounted on said one end; and fastening means passing through said second opening and engaging said first opening to mount said partition member on said second end.

9. Apparatus in accordance with claim 7 including a latch rotatably mounted on said upstanding flanges for contacting said pins to prevent removal thereof from said slots, said latch being responsive to a force thereon to rotate to a position allowing said removal.

10. Apparatus in accordance with claim 7 including at least one conductive strap attached on one end thereof to said bracket means, and a cable shield connector mounted on the other end of said strap and adapted for installation on a cable received within said enclosure for providing an electrical path between said bracket and a shield of said cable.

11. Apparatus in accordance with claim 10 wherein said cable shield connector comprises:

a first plate of conductive material adapted for having one end inserted into said cable in contact with said shield and having a crimp lug on the other end crimped to said conductive strap, said first plate including a threaded stud extending upward therefrom;

a second plate mounted on said stud and adapted for installation over the exterior of said cable, said second plate including a tab depending therefrom and adapted to contact said other end of said first plate to provide a pivot when said first and second plates are forced together; and a nut on said stud for forcing said first and second plates together whereby said first and second plates rotate with respect to each other about said pivot and clamp said shield therebetween.

12. Apparatus in accordance with claim 7 including a flexible conductive strap mounted between said bracket means and said partition member for establishing a ground connection therebetween.

13. Apparatus in accordance with claim 7 including a connector mounting bracket extending forwardly from said bracket means and adapted for having connectors mounted thereon for connecting to said conductors in said channel.

14. Apparatus in accordance with claim 6 wherein said partition member includes an opening therethrough for feeding conductors between said front and rear compartments.

* * * * *